(12) United States Patent
Teghararian et al.

(10) Patent No.: US 6,680,984 B1
(45) Date of Patent: Jan. 20, 2004

(54) DATA SLICER WITH DIGITALLY-CONTROLLED REFERENCE

(75) Inventors: Sarkis Teghararian, Vancouver (CA); Florin Jelea, Burnaby (CA); Dion Michael Horvat, New Westminister (CA); Sukhdeep Hundal, Surrey (CA)

(73) Assignee: Vtech Communications Ltd., Tai Po (HK)

( * ) Notice: Subject to any disclaimer, the term of this patent is extended or adjusted under 35 U.S.C. 154(b) by 0 days.

(21) Appl. No.: 09/548,557

(22) Filed: Apr. 13, 2000

(51) Int. Cl.[7] .......................... H04L 25/06; H04L 25/10
(52) U.S. Cl. ........................................ 375/317
(58) Field of Search .......................... 375/317, 316, 375/214, 319, 377; 327/306, 307

(56) References Cited

U.S. PATENT DOCUMENTS

| | | | |
|---|---|---|---|
| 4,481,675 A | | 11/1984 | Ichikawa et al. |
| 5,760,844 A | * | 6/1998 | Jorden .................... 348/691 |
| 5,909,143 A | | 6/1999 | Weber |
| 5,933,455 A | | 8/1999 | Hendrickson et al. |
| 5,960,046 A | * | 9/1999 | Morris et al. ............ 375/347 |
| 6,172,637 B1 | * | 1/2001 | Kugler .................... 341/158 |
| 6,249,552 B1 | * | 6/2001 | Cana et al. .............. 375/319 |
| 6,349,121 B1 | * | 2/2002 | Anderson ................ 375/317 |

FOREIGN PATENT DOCUMENTS

EP            00310076       5/2003

OTHER PUBLICATIONS

Motorola, "Wideband FM IF System", pp. 1–19, Motorola, Inc. 1998.

Motorola, "An IF Communication Circuit Tutorial" by Albert Franceschino, pp. 1–8, Motorola, Inc. 1996.

* cited by examiner

*Primary Examiner*—Mohammad H. Ghayour
(74) *Attorney, Agent, or Firm*—Shaw Pittman LLP

(57) ABSTRACT

The present disclosure discloses a method and apparatus for slicing data, or "squaring up" a signal such as the output of a wireless receiver demodulator for proper interface with conventional digital logic circuits. The method involves the receiving of an input signal, the generation of a reference level, the comparison of the input signal to the reference level, and the measurement and storage of the reference level. The reference level is generated by applying the input signal to a filter, which has been previously set to an initial condition. The reference level is measured at a predetermined point in a receive data frame, and is maintained at the desired level throughout the remainder of the frame. After a frame has been received, the reference level is stored if the frame data output from the data slicer contained no errors. For multi-channel receivers, in which a different data slicer reference level may be optimal for each channel, a separate filter initial condition can be stored for each channel, and the reference level is set to the stored initial condition corresponding to the current channel prior to receiving data on the current channel.

13 Claims, 4 Drawing Sheets

DATA SLICER WITH DIGITALLY-CONTROLLED REFERENCE

BACKGROUND OF THE INVENTION

As electronic devices utilizing wireless digital communications techniques become increasingly prevalent in modern society, the increase in wireless traffic over a fixed number of allocated frequency bands forces product designers to maximize efficient allocation and use of the frequency spectrum.

To achieve more efficient utilization of a limited frequency spectrum and increased performance of radio traffic on adjacent channels, designers frequently employ techniques which involve filtering of the signal at various stages in the transmission process. However, while filtering the digital signal at the transmitter side of a communications link improves certain characteristics of the transmitted signal, this practice places additional burden on the receiver. Specifically, the digital signal recovered by the receiver demodulator typically is not a clean digital signal—rather, it tends to be sinusoidal in nature. In order to interface the recovered signal with digital receiver circuitry, it is necessary to employ a circuit known as a data slicer to square up the received signal into a format compatible with standard digital logic.

One type of data slicer known in the art consists primarily of a comparator, which compares the recovered signal with a reference level. Such prior art data slicers then effectively square up the input signal by transitioning their output between logic high and logic low levels as the input signal crosses the reference level.

However, one disadvantage with many prior art data slicers is that extended sequences of ones or zeros in the recovered data stream output from the receiver demodulator can cause erroneous output from the data slicer. These quasi-DC data segments can cause the reference level to begin drifting, or a coupling capacitor to begin accumulating a significant charge, thereby degrading the accuracy of the signal presented to the comparator in the data slicer. Such effects increase the probability of error being introduced in the demodulated data. Accordingly, it is an object of the present invention to prevent the introduction of errors due to data slicer reference level drift.

Certain prior art data slicer designs require each received transmission to begin with a predetermined preamble bit sequence in order for the data slicer to acquire the proper reference level. However, such preamble bits either reduce the usable channel data rate, or increase the channel frequency bandwidth. Therefore, it is an object of this invention to operate without requiring a preamble bit sequence.

Many modern communications systems incorporate time division duplexing or time division multiplexing wherein transmit and receive data from one or more devices is communicated via separate timeslots of a given frequency channel. In such systems, the receiver demodulator will send out valid data on an intermittent basis. Accordingly, it is an object of the present invention to prevent the reference level from changing between periods during which valid data is received.

Frequency hopping communications techniques are increasingly popular in modern communications systems due to their improved power efficiency, security, and resistance to interference. However, varying channel characteristics may result in differing nominal DC levels in the demodulator output for each channel. Therefore, each channel may have a unique ideal reference level for the data slicer comparator. Accordingly, it is an object of this invention to store separate data slicer reference levels for each channel of a multi-channel receiver.

Communications channel interference, and other effects can cause the received data to contain errors. A data slicer reference value derived from an error-ridden packet of received data may also be erroneous. Accordingly, it is an object of this invention for the data slicer to only update channel reference values only when the data received is error-free.

These and other objects of the present invention will become apparent in view of the present specification and drawings.

SUMMARY OF THE INVENTION

The invention includes a data slicer, and a method for slicing data. The data slicer compares an input signal to a reference level, outputting a logic high level when the input signal level is greater than the reference level, and a logic low level when the input signal level is below the reference level.

The data slicer generates a reference level based upon the input signal. The reference level can be determined by applying the input signal to a lowpass filter. After input data has been applied to the filter for a predetermined time period, the reference level is sampled by a signal level measurement circuit, which may include an analog-to-digital converter. The reference level is thereafter held constant at a desired level for the remainder of the received data frame. The desired level may be the measured level. Optionally, the desired level may be equal to a lower limit if the measured level is below the lower limit, or the desired level may be equal to an upper limit if the measured level is above the upper limit. The reference level may be determined by the state of a signal generator, which may include a digital-to-analog converter, that is connected to the comparator by a switch changing from an open to a closed position.

The measured reference level is stored so that the filter can be set to it as an initial condition at the start of subsequent transmissions on the given channel. Optionally, the reference level might only be stored if the data for which it was used to receive contained no errors. The reference levels might be stored by a controller, which controller would also control the analog-to-digital and digital-to-analog converters, and the state of the switch. The controller may store an independent reference level for each channel of a multi-channel receiver.

DETAILED DESCRIPTION OF THE INVENTION

Figure 1:
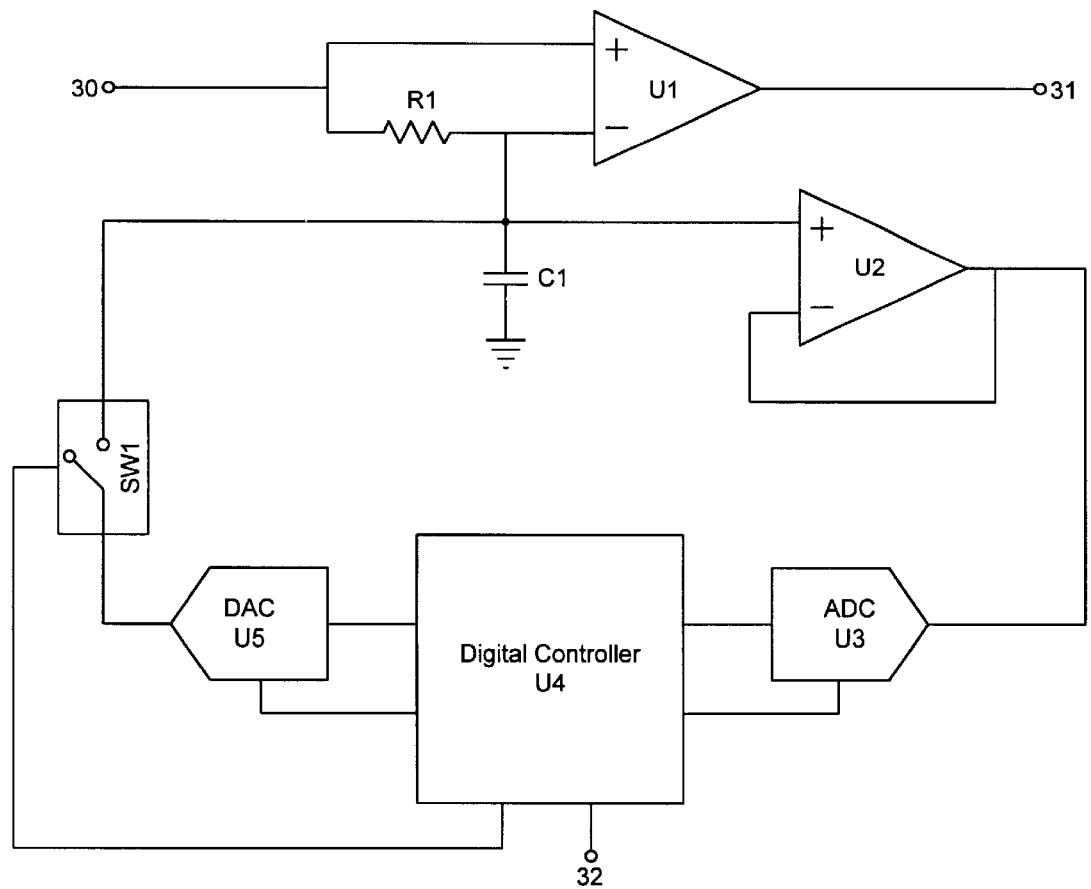
FIG. 1 of the drawings is a schematic block diagram of one embodiment of the invention.

While this invention is susceptible to embodiment in many different forms, there are shown in the drawings and will be described in detail herein several specific embodiments, with the understanding that the present disclosure is to be considered as an exemplification of the principles of the invention and is not intended to limit the invention to embodiments illustrated.

Figure 4:
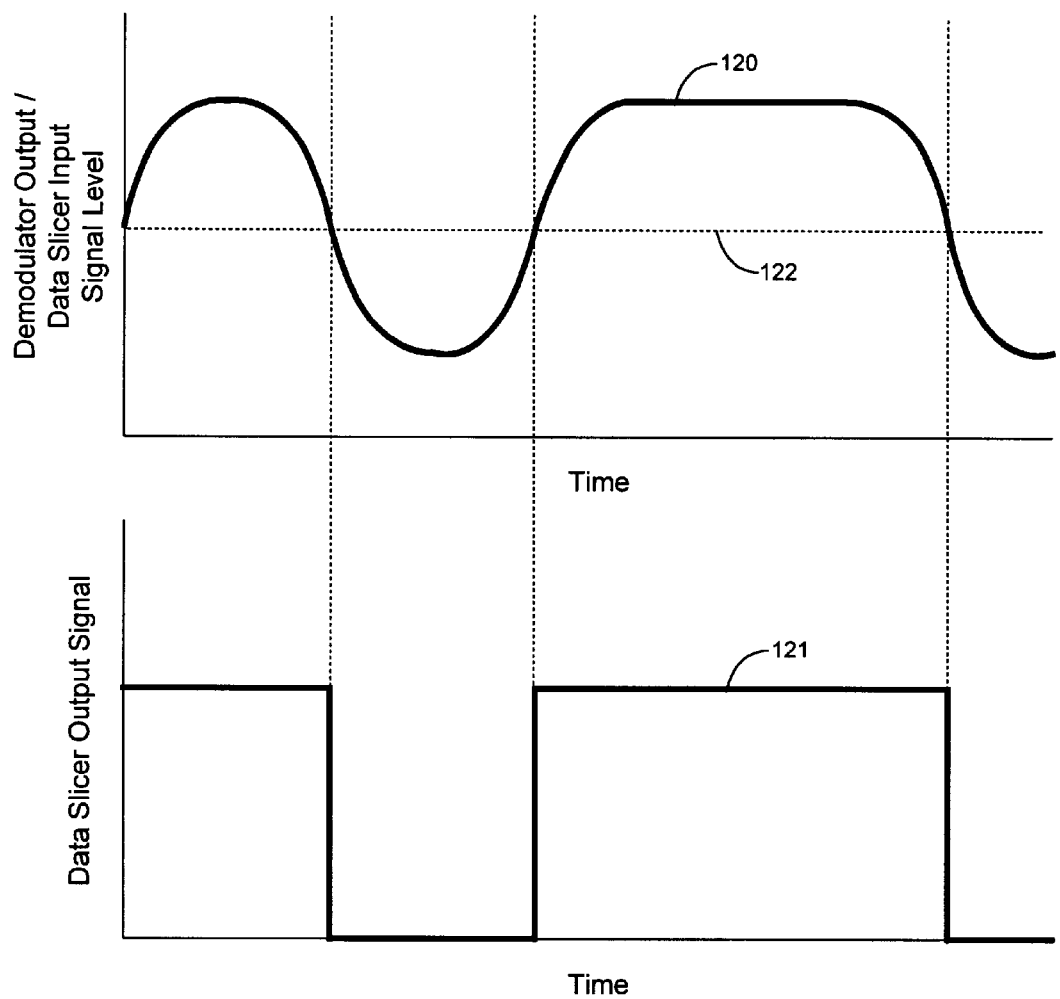
FIG. 4 of the drawings is a graph of a typical data slicer input signal, and the resulting data slicer output signal.

FIG. 1 of the drawings illustrates a first embodiment of the present invention. The data slicer input signal is applied to terminal 30. The input signal will typically be DC-coupled from a demodulator output (not shown). The input signal is applied directly to the positive terminal of comparator U1. The input signal is also applied to a lowpass filter network, comprised of resistor R1 and capacitor C1. In the preferred embodiment, the lowpass RC filter has a corner frequency of 400 Hz, and serves to extract the DC component of the input signal. The RC filter applies the DC component (i.e. the "reference level") to the negative terminal of comparator U1. Data slicer output 31 is the output of comparator U1. FIG. 4 depicts the typical relationship between a data slicer's input and output signals. Input signal 120 represents a typical input signal. Reference level 122 is derived from input signal 120. Output signal 121 transitions each time input signal 120 crosses reference level 122.

The reference level is also buffered by opamp U2 for sampling by analog-to-digital converter U3. Digital controller U4 triggers ADC U3, and the sampled value is passed to controller U4.

Digital controller U4 can specifically determine the data slicer reference level applied to comparator U1 by applying a specific reference value to digital-to-analog converter U5, and closing electronically-operated switch SW1.

Figure 2:
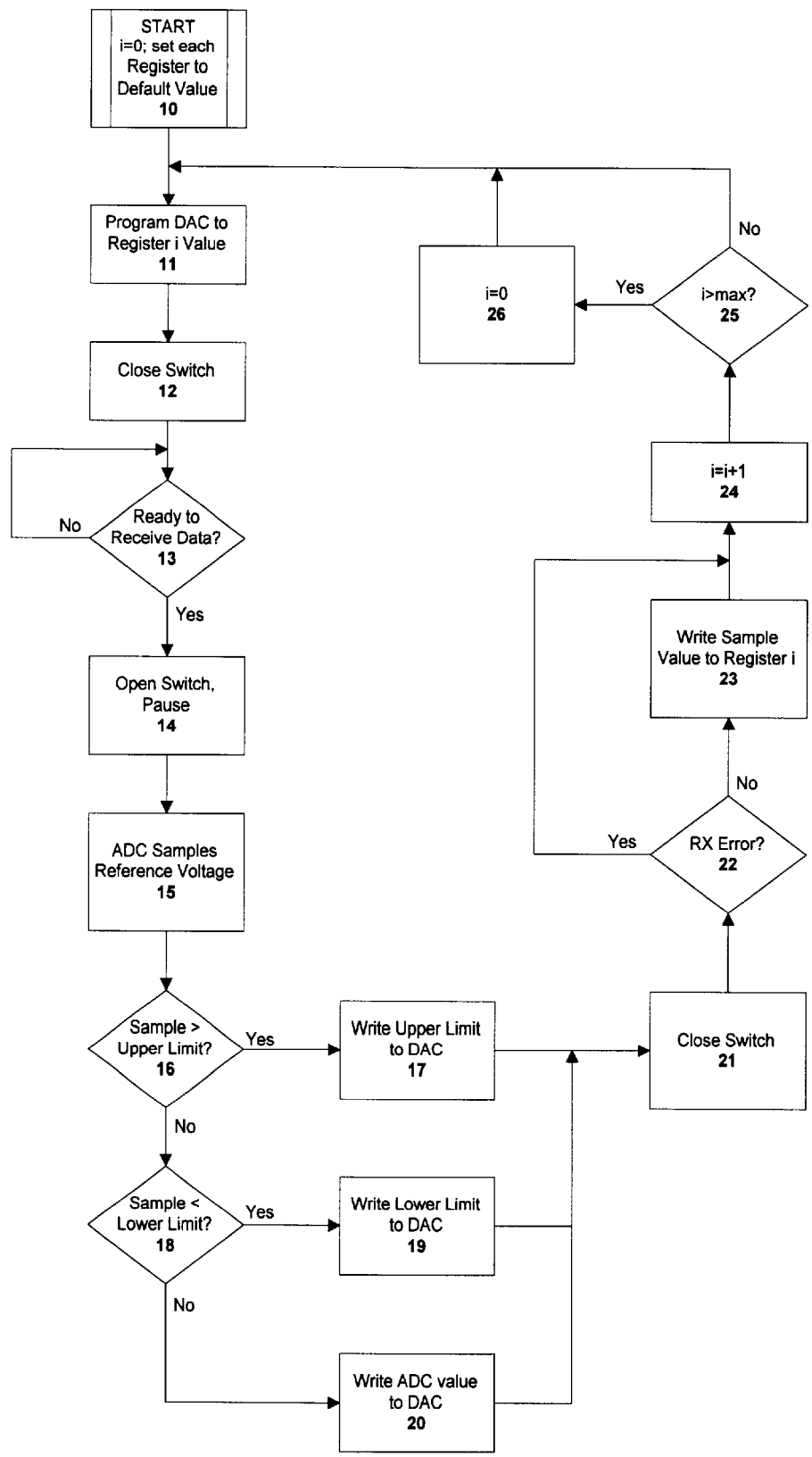
FIG. 2 of the drawings is a flow chart describing operation of the digital controller in the embodiment of FIG. 1.

The operation of the data slicer is controlled by digital controller U4, and illustrated by the flowchart of FIG. 2. The embodiment described by FIGS. 1 and 2 is specifically adapted to a frequency hopping spread spectrum receiver. However, inasmuch as the illustrated embodiment could be adapted by one of ordinary skill in the art, the invention may easily be applied to other types of receivers as well, such as a single-channel time division duplexed receiver.

In the illustrated embodiment, microcontroller U4 includes memory registers that contain a reference level for each channel in a frequency hopping link. Initially, in step 10, each register contains a default value corresponding to a nominal data slicer reference level. In step 11, controller U4 programs DAC U5 with the first stored reference level. Controller U4 then closes switch SW1, thereby applying the reference level to capacitor C1 and the negative terminal of comparator U1. Capacitor C1 charges to the reference voltage during step 13, thereby setting the initial condition of the lowpass filter, until the data slicer begins receiving demodulator output corresponding to valid received data.

Figure 3:
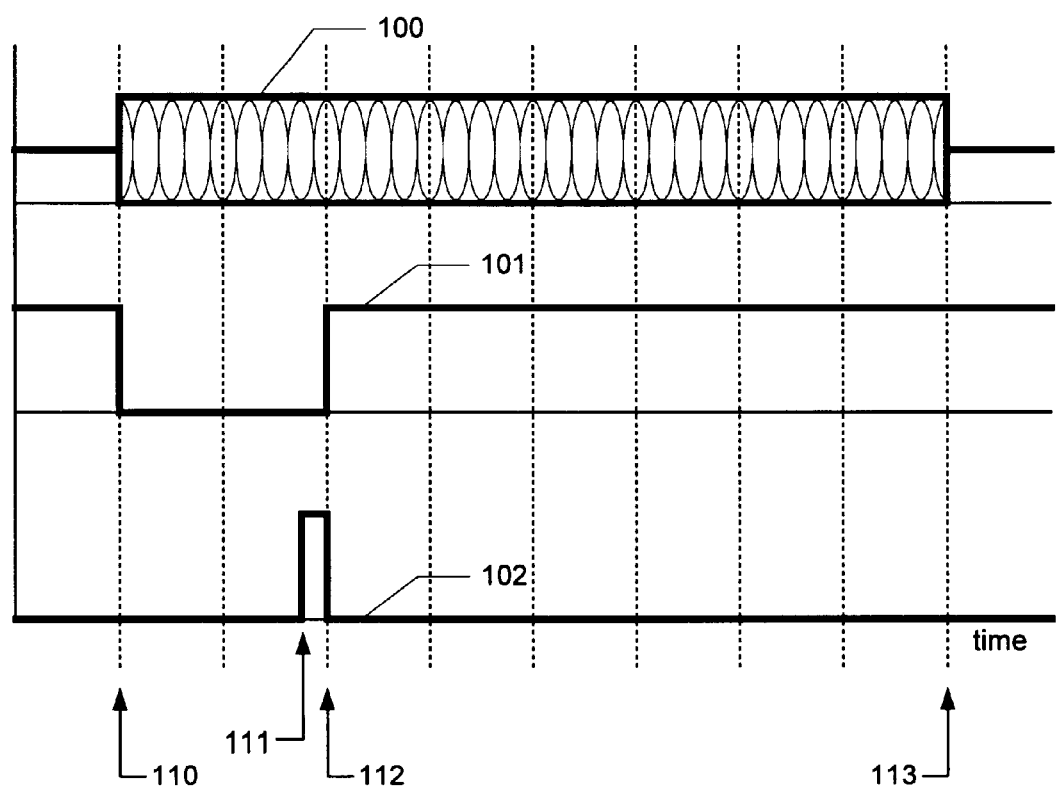
FIG. 3 of the drawings is a graph of the analog-to-digital converter and digital-to-analog converter timing.

The data slicer timing is illustrated in the graph of FIG. 3. Line 100 depicts the timing of a receive data frame. Line 101 depicts the timing of both the state of switch SW1, and the write status of DAC U5. Line 102 depicts the timing of ADC U3 being triggered to sample the reference level. Controller U4 opens switch SW1, step 14, at time 110. The filtered demodulator output adjusts the reference level across C1 between time 110 and time 111. Meanwhile, buffer U2 applies the reference level to the input of ADC U3. At time 111, U4 causes ADC U3 to sample the reference voltage, step 15.

Controller U4 then determines the reference level that will be used for the remainder of the receive data frame. If the sampled level is greater than a predetermined maximum reasonable limit, step 16, the sampled value is presumed erroneous and the upper limit value is written to DAC U5, step 17. If the sampled level is below a predetermined minimum limit, step 18, then the sampled value is also presumed erroneous and the minimum limit is written to DAC U5, step 19. Otherwise, the sampled reference level is written to DAC U5, step 20.

After the reference level is chosen, it is written to DAC U5 and switch SW1 is closed at time 112, step 21. The reference value for comparator U1 is then held at the programmed DAC level throughout the remainder of the receive data frame, from time 112 to time 113. Therefore, even prolonged periods of steady-state demodulator output will not disturb the optimal data slicer reference level. Upon completion of a frame at time 113, controller U4 detects whether the frame was received without error in step 22. In the embodiment of FIG. 1, an external error detection circuit (not shown), which is standard and known in the art of digital receivers, signals controller U4 via input 32 when the data was received without error. If the frame was error free, the data slicer reference value that was used is written to the memory register corresponding to the current channel, step 23. The stored reference level becomes the initial condition to which the filter will be set before the next reception on that channel. If the received data contained errors, the reference level derived from the erroneous transmission is not stored. Because erroneous reference levels are not stored, a bad transmission does not corrupt the data slicer reference.

Finally, controller U4 advances to the next channel in the hopping sequence, and returns to the first channel in the sequence after the last channel is reached, steps 24–26. The above-described process is repeated for each channel in the hopping sequence.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention. In particular, it is envisioned that one of ordinary skill in the art could readily implement the above-described invention entirely in the digital domain by digitizing the demodulator output and processing the digital signal using constructs analogous to those described above.

We claim:

1. A data slicer for squaring-up a digital input signal recovered by a receiver demodulator, the data slicer comprising:

a comparator containing at least a first input terminal to which the input signal is applied, and a second input terminal to which a reference level is applied;

a filter to which the input signal is applied, the output of which constitutes the reference level and is applied to the second terminal of the comparator;

a signal level measurement circuit for measuring the reference level, the input of which is connected to the second terminal of the comparator;

a switch with output connected to the second terminal of the comparator;

a signal generator having an output connected to the switch input;

a controller, which controller is connected to the signal level measurement circuit output, the signal generator, and the switch;

whereby the output of the comparator is the squared-up digital signal, and the controller can measure and specify the reference level.

2. The data slicer of claim 1, in which the filter is comprised of a lowpass RC network.

3. The data slicer of claim 1, in which the signal level measurement circuit includes an analog-to-digital converter, and the signal generator includes a digital-to-analog converter.

4. The data slicer of claim 3, in which the controller stores one or more reference values to which it can set the signal generator.

5. The data slicer of claim 4, in which the controller receives an indication as to whether or not each frame of received data contained errors, and which stores a reference value only when its corresponding frame contained no errors.

6. A method for squaring up a digital data signal, comprising receiving an input data signal;

determining a reference level;

applying the input signal and the reference level to the inputs of a comparator, which comparator's output comprises the squared-up output data signal;

measuring the reference level after a first predetermined time period;

maintaining the reference level at a desired level throughout a second predetermined time period;

determining whether any errors were present in the received squared-up data signal;

storing the measured reference level only if no errors were present in the squared-up data signal.

7. The method of claim 6, in which the input signal is DC-coupled to the first input of the comparator.

8. The method of claim 6, in which the step of determining a reference level is accomplished by applying the input signal to a lowpass filter.

9. The method of claim 7, in which the step of determining a reference level includes the following substeps:

setting a lowpass filter to an initial condition prior to receiving desired input data;

applying the desired DC-coupled input signal to the lowpass filter, which filter's output comprises the reference level.

10. The method of claim 9, in which the lowpass filter is set to an initial condition by applying a previously-stored voltage level to the filter.

11. The method of claim 10, in which a separate reference level is stored for each of a plurality of communications channels, and the previously-stored voltage level which is applied to the lowpass filter is the reference level stored during a prior communication on the channel over which the desired input data is currently being received.

12. The method of claim 6, in which the desired level is equal to the measured level.

13. The method of claim 6, in which the desired level is equal to the measured level, unless the measured level is greater than a predetermined upper limit in which case the desired level is equal to the upper limit, or if the measured level is below a predetermined lower limit in which case the desired level is equal to the lower limit.

* * * * *